Sept. 13, 1932.  B. F. GRAVELY  1,876,662
MOWING MACHINE
Filed April 22, 1929  3 Sheets-Sheet 1
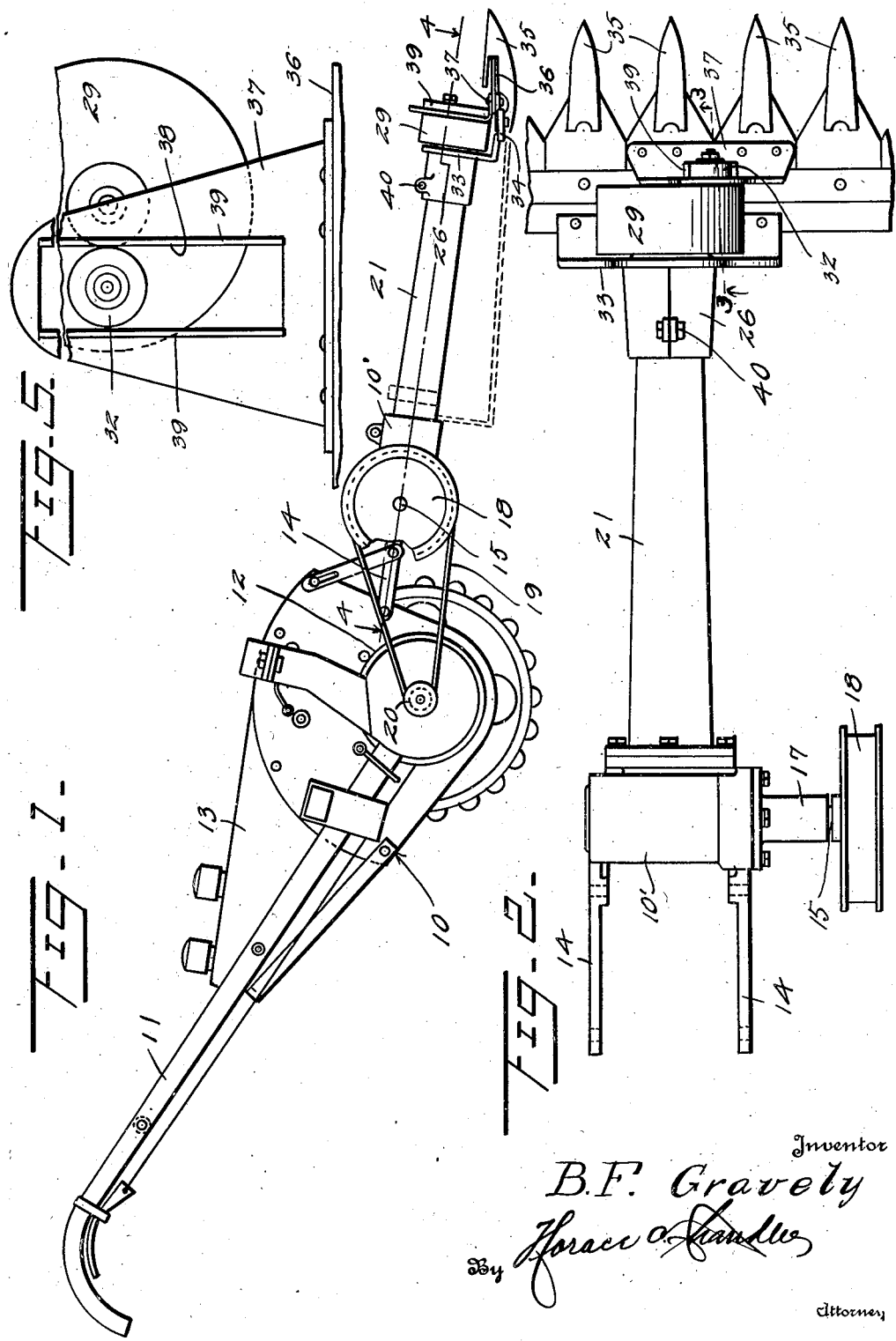

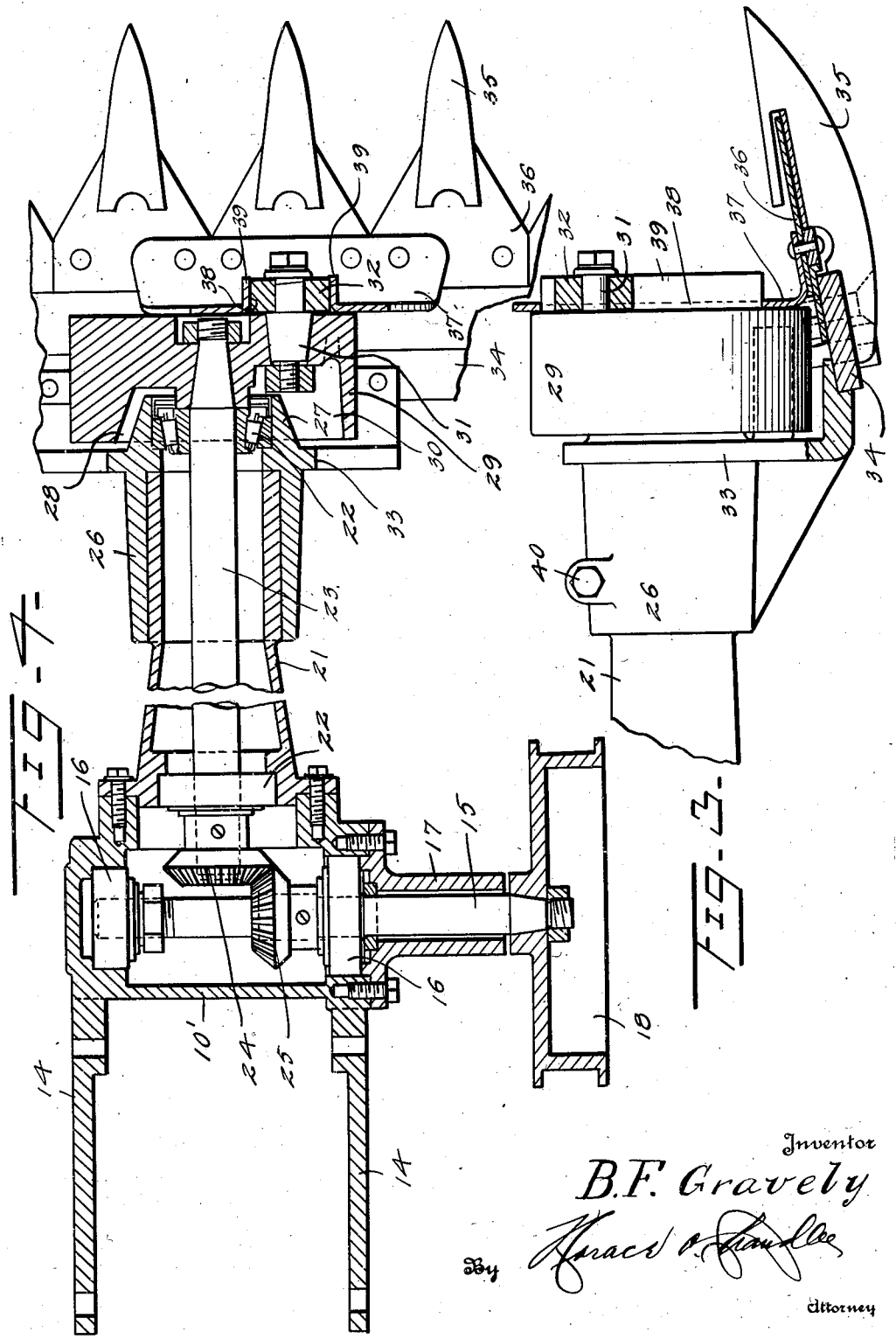

Sept. 13, 1932.    B. F. GRAVELY    1,876,662
MOWING MACHINE
Filed April 22, 1929    3 Sheets-Sheet 3

Inventor
B. F. Gravely

Patented Sept. 13, 1932

1,876,662

UNITED STATES PATENT OFFICE

BENJAMIN F. GRAVELY, OF DUNBAR, WEST VIRGINIA

MOWING MACHINE

Application filed April 22, 1929. Serial No. 357,140.

This invention relates to new and useful improvements in mowing machines.

One object of the invention is to provide a machine of this character which is adapted to cut lawn grass, hay fields, briars, and the like, with equal facility.

Another object is to provide a device of this character which is simple in construction, and which will readily adapt itself to varying ground contours, without interfering with the proper and effective operation of the device.

Another object is to provide a device of this character which is provided with means for insuring the proper positioning of the grass with respect to the cutters, whereby the same is more properly cut.

Other objects and advantages will be apparent from the following description when taken in connection with the accompanying drawings.

In the drawings:

Figure 1 is a side elevation of a mowing machine made in accordance with the present invention.

Figure 2 is a top plan view of the same.

Figure 3 is a vertical longitudinal sectional view on the line 3—3 of Figure 2.

Figure 4 is a horizontal longitudinal sectional view on the line 4—4 of Figure 1.

Figure 5 is an enlarged fragmentary front elevation of the cutter bar driving means.

Figure 6:
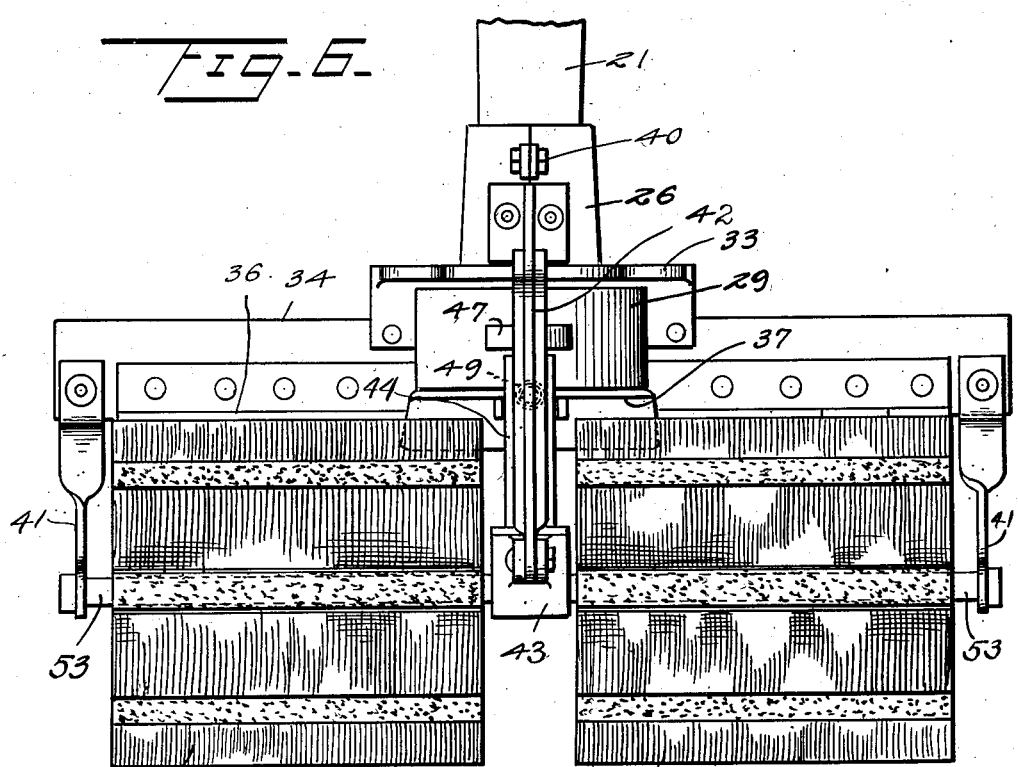
Figure 6 is a top plan view of the front portion of the device showing the same equipped for use in mowing lawns.

Referring particularly to the accompanying drawings, there is shown a frame 10, having the handles 11 attached thereto, and supporting the motor 12, and the tank 13, the latter being adapted to contain liquid fuel for the motor, said motor being of the explosive type. Secured to the forward end of the frame 10 are the arms of a yoke 14, and mounted transversely in forward end of the yoke is a shaft 15, one end of which projects beyond the side of the housing 10′, formed at the forward end of said frame. The shaft 15 is properly journaled in the bearings 16, carried by the housing, and a sleeve 17, secured to one side of the housing, encases the said projecting end of the shaft. On the outer end of the shaft 15 is secured a pulley 18, on which is engaged the drive belt 19, which also engages with the pulley 20 of the motor, and by means of which the shaft is driven. Secured to the forward side of the housing 10′, and extending forwardly at right angles therefrom, is a tapering housing 21, each end of which is provided with suitable bearings 22, in which are disposed the ends of the shaft 23. The rear end of the shaft 23 is provided with a bevel gear 24 which meshes with a bevel gear 25 on the transverse shaft 15, within the housing 10′. Snugly fitted on the forward end of the tapering housing 21 is a sleeve 26, which has a forward tapering end 27 disposed within a recess 28 in the rear face of the fly-wheel 29, which is detachably secured on the forward end of the shaft 23. The recess 28 is slightly enlarged at 30, and disposed through the fly-wheel, with its rear end within the portion 30, is a bolt 31, the forward end of which carries a roller 32. Formed integrally with the forward end of the sleeve 26, and extending downwardly and forwardly therefrom, is an L-shaped arm 33, and mounted on the forward portion of the horizontal arm thereof is the transverse bar 34 which carries the guard fingers 35, and in which fingers slides the cutter bar 36. Secured to the intermediate portion of the cutter bar, and rising therefrom, is an L-shaped bracket member 37, the vertical arm of which is formed with a longitudinal slot 38, the side walls of which extend forwardly in parallel relation to each other, to provide flanges 39, between which the before-mentioned roller 32 plays. The sleeve 26 is longitudinally split, as shown, and has a transverse bolt 40, by means of which the sleeve may be tightened or loosened on the forward end of the housing 21, whereby to regulate the lateral rocking movements of the cutter thereon, independently of the fly-wheel and said housing, so that said cutter may move laterally in accordance with the contour of the ground, over which the mower is being moved, while the remainder of the device, including the motor, and the handles may be held in a constant horizontal position.

In the operation of the device, the motor drives the transverse shaft 15, through the medium of the belt 19, which in turn drives the shaft 23. The fly-wheel 29 is rotated by the shaft 23, causing the stud 31 to act upon the walls 39, whereby to reciprocate the cutter bar 36, to cut the material coming between the fingers and cutters. When the bolt 40 is tight, so that the sleeve 26 is immovable on the casing 21, the cutter device remains in a condition, or position, fixed with relation to the remainder of the devices. When, however, the said bolt is loosened, the sleeve 26 is capable of rotary movement on the casing 21, whereby to permit the cutting mechanism to rock sidewise, to accommodate its position to the contour of the ground, over which the device is being moved.

Figure 7:
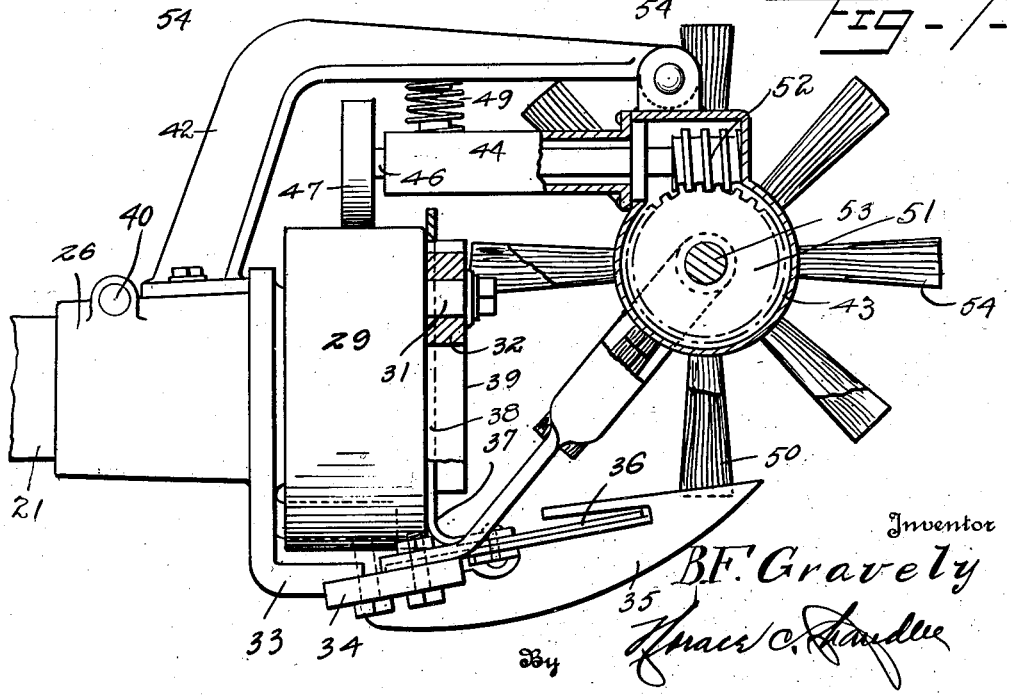
Figure 7 is a side elevation of the device of Figure 6, partly in section.

To adapt the mowing device for use on lawns, certain mechanism shown in Figures 6 and 7 are applied to the device. As shown in these figures, a pair of upwardly and forwardly extending arms 41 are secured to the ends of the bar 34. Secured to the sleeve 26, and extending upwardly and forwardly over the cutting mechanism, in parallel relation to and between the arms 41, is the arm 42, a gear casing 43 being carried by the forward end of said arm. Extending rearwardly from the casing 43 is a sleeve 44, and disposed within the sleeve is a shaft 46, the rear, or exposed end of which is provided with a friction wheel 47, engaging the peripheral face of the fly-wheel 29. Engaged with the lower face of the arm 42 and the upper face of the sleeve 44, is a coil spring 49, which serves to maintain the wheel 47 engaged with the wheel 29. Within the casing 43 is the worm-wheel 51, which meshes with the worm 52, carried by the forward end of the said shaft 46. Journaled at its ends in the forward ends of the arms 41, is the transverse shaft 53, the intermediate portion of which extends through the casing 43, and has the said worm-wheel 51 secured thereto. Radiating from the portions of the shaft 53, between the arms 41 and the casing 43, are bristle tufts 54, whereby to form a rotary brush for drawing the grass into the cutting mechanism.

What is claimed is:

1. A mowing device including a housing, a shaft in the housing, a fly-wheel on one end of the shaft, a sleeve on the housing, a bracket on the sleeve, a cutter mechanism on the bracket including a cutter bar, a slotted arm extending vertically from the cutter bar, and means on the fly-wheel engaged in the slot of said arm for reciprocating said cutter bar.

2. A mowing device including a housing, a drive shaft in the housing, a fly-wheel on an end of the shaft, a sleeve releasably held on said end of the housing, a bracket carried by the sleeve, a cutting mechanism mounted on the bracket including a reciprocable cutter bar, a vertical slotted member on the cutter bar, and a stud on the fly-wheel engaged in said slotted member for reciprocating said cutter bar.

3. A mowing device including a supporting frame, a motor driven cutting mechanism supported on the frame, a shaft forming a part of the mechanism having a friction wheel thereon, a reel supported on the frame, and means between the friction wheel and the reel for driving said reel.

4. A mowing device including a supporting frame, a motor driven cutting mechanism supported on the frame, a shaft forming a part of the mechanism having a friction wheel, a transverse rotary brush supported above the cutting mechanism, and a friction wheel carried by the brush engaged with the periphery of the first friction wheel.

5. A mowing device including a housing, a drive shaft in the housing, a bracket mounted on the housing, a transversely reciprocable cutter bar on the bracket, a vertical plate carried by said cutter bar and having a vertical slot therein the side walls of which extend therefrom in parallel relation, a fly-wheel on said drive shaft, a stud on said fly-wheel extending through said slot, and a roller in said slot arranged to engage said side walls as the fly-wheel rotates, whereby to reciprocate said cutter bar.

6. A mowing machine including a housing, a drive shaft in the housing, a sleeve releasably held on an end of the housing for rotatable adjustment thereon, and a cutting mechanism mounted on the sleeve including a cutter bar and a fly-wheel for operating the latter, said fly-wheel being mounted on said shaft in position to hold said sleeve on said housing.

7. A mowing device including a frame, a tubular housing extending therefrom, a shaft in the housing, a support including a sleeve frictionally clamped on the outer end of said housing for rotatable adjustment thereon, a cutter bar on said support, and a drive wheel on the shaft for driving said cutter bar and engaging with said end of the housing for holding the sleeve on said housing.

In testimony whereof, I affix my signature.

BENJAMIN F. GRAVELY.